United States Patent [19]
Kambies

[11] Patent Number: 5,761,991
[45] Date of Patent: Jun. 9, 1998

[54] ADJUSTABLE ROTISSERIE BASKET ASSEMBLY

[75] Inventor: Edward J. Kambies, South Euclid, Ohio

[73] Assignee: Cleveland Range, Inc., Cleveland, Ohio

[21] Appl. No.: 701,398

[22] Filed: Aug. 22, 1996

[51] Int. Cl.⁶ ..................................................... A47S 37/04
[52] U.S. Cl. ........................................... 99/427; 99/421 R
[58] Field of Search ........................... 99/421 R, 419, 99/426, 427, 449

[56] References Cited

U.S. PATENT DOCUMENTS

| | | | |
|---|---|---|---|
| 2,983,218 | 5/1961 | Persinger et al. | 99/427 |
| 3,504,620 | 4/1970 | Gerhardt | 99/427 |
| 3,585,922 | 6/1971 | Peterson. | |
| 3,802,331 | 4/1974 | Zickefoose. | |
| 3,922,961 | 12/1975 | Case | 99/427 |
| 4,114,523 | 9/1978 | Eff. | |
| 4,442,762 | 4/1984 | Beller. | |
| 4,442,763 | 4/1984 | Beller. | |
| 4,555,986 | 12/1985 | Eisenberg. | |
| 4,817,514 | 4/1989 | Hitch et al. | |
| 5,297,534 | 3/1994 | Louden. | |
| 5,325,767 | 7/1994 | Beller. | |
| 5,431,093 | 7/1995 | Dodgen. | |

*Primary Examiner*—Reginald L. Alexander
*Attorney, Agent, or Firm*—Ohlandt, Greeley, Ruggiero & Perle

[57] ABSTRACT

An adjustable rotisserie basket assembly for use in a rotisserie oven that includes a basket having a mount for mounting the basket in the rotisserie oven, a bottom surface for supporting a food item, and a clamp having a surface for adjustably contacting, compressing and stabilizing the food item within the basket, wherein the clamp does not extend past the contacting surface in the direction of the food item, thus allowing the clamping means to adjust to the food item's unique dimensions.

10 Claims, 3 Drawing Sheets

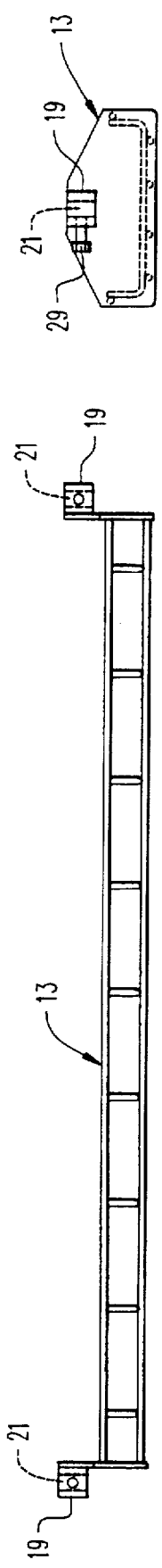
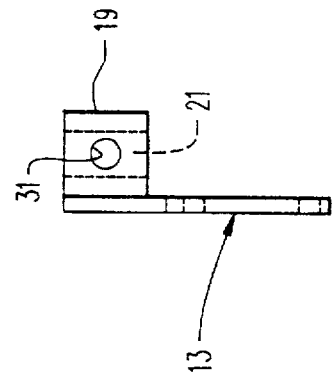
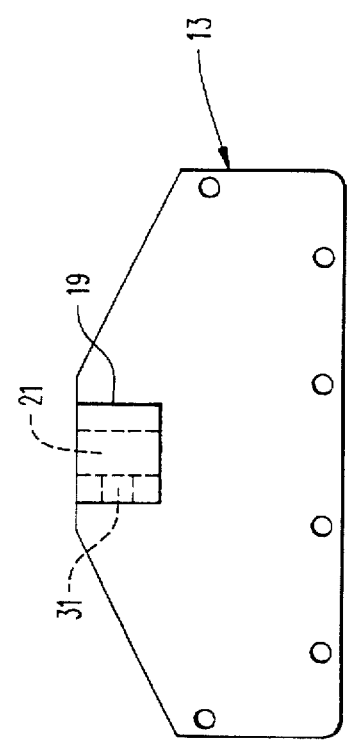

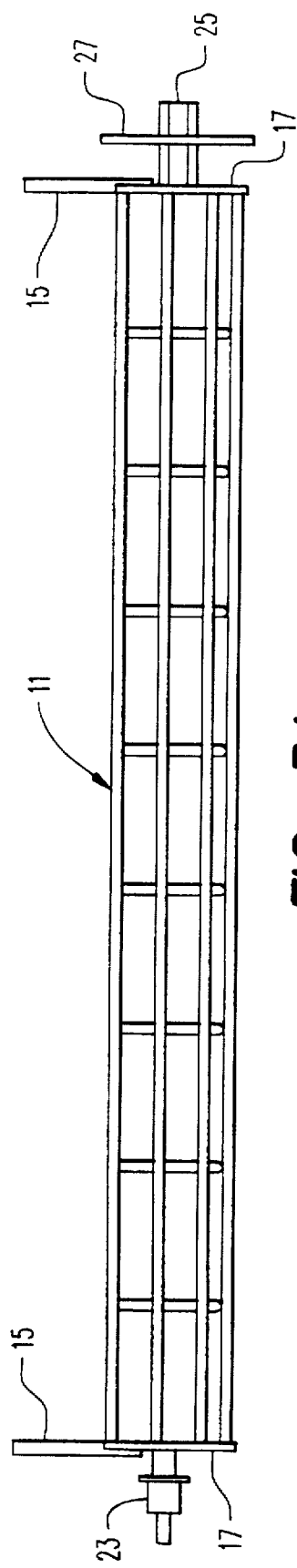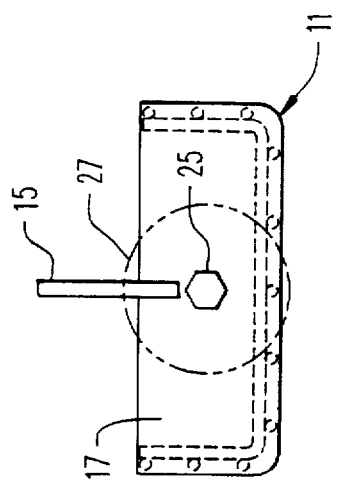

ADJUSTABLE ROTISSERIE BASKET ASSEMBLY

The present invention relates to a basket assembly for holding food items to be cooked in a rotisserie oven. More particularly, the present invention relates to a telescoping basket assembly capable of adjusting to the unique dimensions of individual food items placed in the basket for cooking.

BACKGROUND OF THE INVENTION

Rotisserie ovens are well established in the art. Typically, food to be cooked is skewered on one or more spits and mounted in the rotisserie oven where the food is exposed to the heat source. This design has several drawbacks. First, a substantial amount of force is needed to skewer many types of food, particularly meat, making the process both difficult and unwieldy. The skewer must be pointed to adequately penetrate the food item, and such pointed skewers pose a danger to the cook or operator. In addition, the skewer creates undesirable and unesthetic holes in the finished food product. Furthermore, skewers are only practical for certain types of food, such as whole chickens and whole pigs, which have enough structure to be rotated and cooked on the skewer in the oven without falling from the skewer. Even these food items often shed wings or legs in the heat of the rotisserie oven.

Attempts have been made to address these problems in the prior art. U.S. Pat. No. 4,442,762 to Beller discloses a rotisserie oven having a spit basket for holding food items in the oven. This basket employs confronting sets of grate fingers for gripping meat items. Because the fingers alone provide food-gripping contact, only food items that are large enough to be seated in the basket, while also extending between the sets of fingers, will be properly gripped in the basket. Furthermore, the gripping fingers present a safety threat much like that of the pointed spit.

Another design is disclosed in U.S. Pat. No. 4,555,986 to Eisenberg. In this patent, the rotisserie basket is comprised of two horizontally interlocking baskets having inner cylindrical parts and outer conical parts. This design also has a number of drawbacks. First, only food items approximately the size of the volume enclosed by the joined baskets will be securely held. Smaller items will tumble freely about the basket, and in the process be damaged, because the volume enclosed is variable only to a certain extent. Second, this basket is very difficult to load and unload, because of the horizontal interrelationship of its elements. The basket elements cannot be separated in the oven, because food items would fall freely from the baskets.

The present inventor has found a solution to the limitations of the prior art. A rotisserie basket assembly is disclosed which is easy to load and unload, safe to use, and which conforms to any size food item to ensure proper cooking.

SUMMARY OF THE INVENTION

An adjustable rotisserie basket assembly is disclosed for use in a rotisserie oven, that includes a basket having a mount for mounting the basket in the rotisserie oven, a bottom surface for supporting a food item, and a clamp having a surface for adjustably contacting, compressing and stabilizing the food item within the basket, wherein the clamp does not extend past the contacting surface in the direction of the food item, thus allowing the clamp to adjust to the food item's unique dimensions.

The rotisserie basket assembly clamp can contact the food item on a first side substantially opposite to a second side contacted by the bottom surface of the basket. The basket can also include at least one pin, and the clamp can also include at least one aperture sized to fit over the pin and at least one bolt to tighten the clamp on the pin. The clamp can be basket-shaped, and can telescope about the pin of the basket.

In certain embodiments, the bottom surface of the basket and the surface of the clamp are substantially flat. The mount can include an idler end and a drive end. The idler end has a round peg and the drive end has a polygonal peg and a skewer plate seated on the polygonal peg and perpendicular to a longitudinal axis of the polygonal peg. The polygonal peg can be hexagonal and the skewer plate can be circular and include a hexagonal aperture to accept the hexagonal peg.

An alternate adjustable rotisserie basket assembly is disclosed for use in a rotisserie oven including a basket having a hexagonal peg for engaging a drive of the rotisserie oven, a second peg on an opposite side of the basket for engaging the rotisserie oven, at least one vertical pin, and a bottom surface for supporting a food item, and a clamp having at least one aperture sized to fit over the pin, at least one bolt to tighten the clamp on the pin, and a surface for adjustably contacting the food item within the basket.

A further adjustable rotisserie basket assembly for use in a rotisserie oven is disclosed that includes a first basket for holding a food item, which first basket has two vertical pins and a mount for mounting the first basket in the rotisserie oven, a second basket with two apertures to accept the vertical pins, wherein the second basket telescopes within the first basket along the vertical pins until the second basket contacts and compresses the food item, and means for tightening the second basket about the vertical pins, whereby the food item is securely disposed between the first and second baskets.

BRIEF DESCRIPTION OF THE DRAWINGS

FIG. 2A is a front view of the upper basket of the assembly of FIG. 1A.

FIG. 2B is a left side view of the upper basket of FIG. 2A.

FIG. 3A is a front view of the lower basket of the assembly of FIG. 1A.

FIG. 3B is a left side view of the lower basket of FIG. 3A.

FIG. 4A is a diagram of the upper basket depicted in FIG. 2B showing the clamping means.

FIG. 4B is a diagram of the upper basket support structure shown in FIG. 2A.

DESCRIPTION OF THE PREFERRED EMBODIMENTS

Figure 1A:
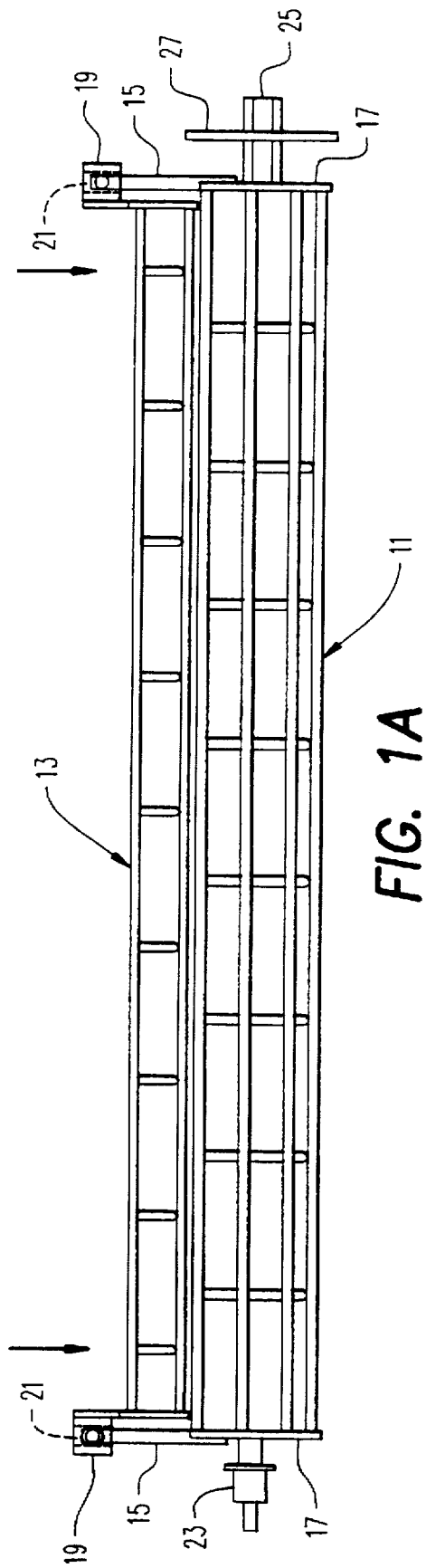
FIG. 1A is a front view of a preferred embodiment of the rotisserie basket of the present invention.

As shown in FIGS. 1A through 4B, a preferred embodiment according to the present invention comprises a basket assembly including lower basket 11 and upper basket 13. Baskets 11 and 13 are formed of welded stainless steel bar, flat stock, and wire or of metal mesh, so as to allow juices and fats to pass through during cooking, and to provide an enclosed food item with even exposure to the heat source of the rotisserie oven. When there are no food items in lower basket 11, upper basket 13 sits, or telescopes, within lower basket 11, base to base. Lower basket 13 has two square vertical pins 15 that project upward from the center of sides 17. Upper basket 13 has two supports 19 integral with, but extending upward and outward from, upper basket 13. Each support 19 has a central vertical aperture 21 sized to fit over square pins 15. Upper basket 13 is connected to lower basket 11 by sliding supports 19 over pins 15. Lower basket 11 also has two integral horizontal support posts 23 and 25 for mounting the basket assembly in a rotisserie oven. Support post 23 is an idler end formed of concentric pegs and sized to fit within a support on the idler end of a rotisserie oven drive. Support post 25 is a drive end comprised of a hexagonal peg having circular stop plate 27 about its circumference, intermediate between its exposed end and side 17. Support post 25 is sized to fit within the drive end of a rotisserie oven drive.

This preferred embodiment basket assembly can be loaded either in or out of the rotisserie oven. Preferably, the basket assembly is loaded out of the oven. The rotisserie operator loads a food item, for example a turkey breast, in lower basket 11. Apertures 21 of upper basket 13 are then aligned with pins 15 of lower basket 11, and upper basket 13 is lowered toward the turkey breast. When the flat bottom surface of upper basket 13 contacts the turkey breast, screws 29 mounted in horizontal apertures 31 in supports 19 are tightened to secure upper basket 13 in place relative to lower basket 11 and the turkey breast. Apertures 31 open into apertures 21, thus allowing flat bottomed screws 29 to contact and directly secure pins 15. The basket assembly is thus fully adjustable to a food item of any depth, limited only by the height of pins 15.

The assembly is then taken to the rotisserie oven, where support post 23 is inserted into the mating aperture of the idler end of the rotisserie oven drive. Support post 25 is then inserted into the mating aperture of the drive end of the rotisserie oven drive. Stop plate 27 allows only the proper amount of support post 25 to be inserted into the mating aperture. The basket assembly is now secure within the rotisserie oven, the turkey breast is secure within the basket assembly, and cooking can begin. The basket assembly of this preferred embodiment also allows easy adjustment during cooking. If the turkey breast shrinks during cooking, the upper basket screws are accessible and easily adjusted by the operator without removing the basket assembly from the oven.

Figure 1B:
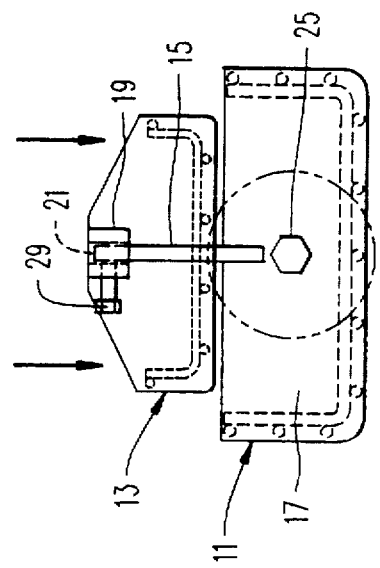
FIG. 1B is a left side view of the rotisserie basket of FIG. 1A.

FIGS. 2A through 4B show the components of the assembly of FIGS. 1A and 1B individually. FIG. 2A shows upper basket 13 as a shallow, elongated basket having a rectangular cross-section. Two pins 15 extend upward from the ends of basket 13. Each pin 15 includes a support 19. As can best be seen with reference to FIGS. 2B, 4A and 4B, each support 19 includes a box shaped protrusion at its top end having threaded aperture 31 horizontally bored through one vertical face to meet aperture 21 bored vertically through the depth of the protrusion. In use, when pin 15 is inserted into aperture 21, screw 29 is inserted into aperture 31 and screwed until pin 15 is contacted. When screw 29 is tightened against pin 15, upper basket 13 and lower basket 11 are frictionally stabilized relative to one another.

FIGS. 3A and 3B show the lower basket 11 of FIGS. 1A and 1B. It too is an elongated but deeper basket having a rectangular cross-section. Pins 15 extend upward from the center of sides 17 to engage upper basket 13, as discussed above.

What is claimed is:

1. A non-incrementally adjustable rotisserie basket assembly for use in a rotisserie oven comprising:

(a) a basket comprising mounting means for mounting said basket in said rotisserie oven, said basket further comprising a bottom surface for supporting a food item; and (b) a clamping means comprising a surface for adjustably contacting, compressing and stabilizing the food item within said basket, wherein said clamping means does not extend past said contacting surface in the direction of the food item, thus allowing the clamping means to adjust to said food item's unique dimensions.

2. The rotisserie basket assembly of claim 1, wherein said surface of said clamping means contacts the food item on a first side substantially opposite to a second side contacted by the bottom surface of said basket.

3. The rotisserie basket assembly of claim 1, wherein said bottom surface of said basket and said surface of said clamping means are substantially flat.

4. The rotisserie basket assembly of claim 1, wherein said mounting means comprises an idler end and a drive end.

5. An adjustable rotisserie basket assembly for use in a rotisserie oven comprising:

(a) a basket comprising mounting means for mounting said basket in said rotisserie oven, said basket further comprising a bottom surface for supporting a food item; and (b) a clamping means comprising a surface for adjustably contacting, compressing and stabilizing the food item within said basket, wherein said clamping means does not extend past said contacting surface in the direction of the food item, thus allowing the clamping means to adjust to said food item's unique dimensions, wherein said basket further comprises at least one pin, and wherein said clamping means further comprises at least one aperture sized to fit over said pin and at least one bolt to tighten said clamping means on said pin.

6. The rotisserie basket assembly of claim 5, wherein said clamping means telescopes about said pin of said basket.

7. An adjustable rotisserie basket assembly for use in a rotisserie oven comprising:

(a) a basket comprising mounting means for mounting said basket in said rotisserie oven, said basket further comprising a bottom surface for supporting a food item; and (b) a clamping means comprising a surface for adjustably contacting, compressing and stabilizing the food item within said basket, wherein said clamping means does not extend past said contacting surface in the direction of the food item, thus allowing the clamping means to adjust to said food item's unique dimensions, wherein said mounting means comprises an idler end and a drive end, and wherein said idler end comprises a round peg and said drive end comprises a polygonal peg and a skewer plate seated on said polygonal peg and perpendicular to a longitudinal axis of said polygonal peg.

8. The rotisserie basket assembly of claim 7, wherein said polygonal peg is hexagonal and wherein said skewer plate is circular and further comprises a hexagonal aperture to accept said hexagonal peg.

9. An adjustable rotisserie basket assembly for use in a rotisserie oven comprising:

(a) a basket comprising mounting means for mounting said basket in said rotisserie oven, said basket further comprising a bottom surface for supporting a food item; and (b) a clamping means comprising a surface for adjustably contacting, compressing and stabilizing the food item within said basket, wherein said clamping means does not extend past said contacting surface in the direction of the food item, thus allowing the clamping means to adjust to said food item's unique dimensions, and wherein said clamping means is basket-shaped.

10. An adjustable rotisserie basket assembly for use in a rotisserie oven comprising:

(a) a first basket for holding a food item, which first basket comprises two vertical pins and mounting means for mounting said first basket in said rotisserie oven;

(b) a second basket comprising two apertures to accept said vertical pins, wherein said second basket telescopes within said first basket along said vertical pins until said second basket contacts and compresses said food item; and (c) means for tightening said second basket about said vertical pins, whereby said food item is securely disposed between said first and second baskets.

* * * * *